United States Patent [19]

Neef

[11] Patent Number: 4,802,754
[45] Date of Patent: Feb. 7, 1989

[54] SOFT-PAD SYSTEM FOR A SPECTACLE FRAME

[75] Inventor: Heinz Neef, Stuttgart, Fed. Rep. of Germany

[73] Assignee: Marwitz & Hauser GmbH, Stuttgart, Fed. Rep. of Germany

[21] Appl. No.: 34,283

[22] Filed: Apr. 2, 1987

[30] Foreign Application Priority Data

Apr. 2, 1986 [EP] European Pat. Off. ........ 86104464.2

[51] Int. Cl.$^4$ .............................................. G02C 5/12
[52] U.S. Cl. ...................................... 351/138; 351/136
[58] Field of Search ................. 351/136, 138, 139, 87, 351/88

[56] References Cited

U.S. PATENT DOCUMENTS

| | | |
|---|---|---|
| 2,035,785 | 3/1936 | Bouchard . |
| 2,677,988 | 5/1954 | Belgard ............................. 351/138 |
| 2,881,661 | 4/1959 | Laisne ............................... 351/138 |
| 3,189,913 | 6/1965 | Hoffmaster . |
| 4,142,784 | 3/1979 | Bononi .............................. 351/136 |
| 4,243,306 | 1/1981 | Bononi .............................. 351/136 |

FOREIGN PATENT DOCUMENTS 0146934 7/1985 European Pat. Off. .
2140934 12/1984 United Kingdom .

Primary Examiner—Rodney B. Bovernick
Assistant Examiner—P. M. Dzierzynski
Attorney, Agent, or Firm—Walter Ottesen

[57] ABSTRACT

A spectacle frame has pad legs formed in the region of the nose flanks of the nose of the person wearing the spectacles. A soft-pad system includes soft pads for insertion in corresponding recesses formed in the pad legs. The soft pads serve to brace the spectacle frame on the nose of the person wearing the spectacles in a soft and slip-free manner. In order to take account of the different anatomical conditions that occur when fitting spectacles, the pads can be so configured that they have different thicknesses at different locations on their bearing surface. In this way, a soft-pad system is provided which includes a plurality of soft pads in which each pad of a pair of pads is identical and each pad pair is configured differently. For each situation, a single pad pair will be inserted into the spectacle frame with the pad pair configured in correspondence with the anatomical requirements.

9 Claims, 1 Drawing Sheet

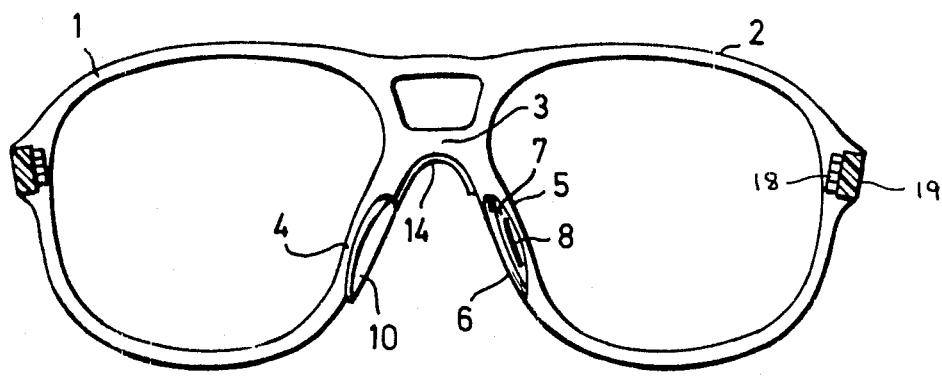

SOFT-PAD SYSTEM FOR A SPECTACLE FRAME

FIELD OF THE INVENTION

The invention relates to a soft-pad system for a spectacle frame wherein the soft pads are inserted in corresponding recesses formed in the pad legs of a spectacle frame.

BACKGROUND OF THE INVENTION

German published patent application DE-OS 33 19 827 discloses a spectacle frame having pad legs mounted in the region of the nose flanks. Removable soft pads are seated in the pad legs. Each soft pad is made of a soft material such as silicone rubber and has a bearing surface fitted to a recess of the pad leg. A shank-like extension is fixedly attached to the bearing surface for clipping into an opening of this recess.

This spectacle frame affords the advantage that the soft pads brace on the nose of the person wearing the spectacles in a soft and slip-free manner. In this way, a trouble-free and correct seating of the spectacles is assured.

The above-mentioned German patent publication also teaches that several soft pads of respectively different thicknesses can be provided so that by clipping in a soft pad of suitable thickness, an adjustment of the elevation of the frame holding the lens is possible.

By utilizing soft pads of respectively different thicknesses for which the front and rearward sides of each pad are mutually parallel, the elevation of the spectacle frame can be adjusted within certain boundaries. However, it is not possible to take into consideration the different anatomical characteristics of the facial forms as they occur in the regions of the nose flanks and nose root.

SUMMARY OF THE INVENTION

In view of the above, it is an object of the invention to provide a soft-pad system wherein the soft pads are inserted in corresponding recesses of the pad legs of a spectacle frame which make it possible to adapt the one and the same spectacle frame to different anatomical characteristics of the facial form in a simple manner.

According to a feature of the invention, the pads are configured so that they can be exchangeably clipped into the recesses of the pad legs of the spectacle frame. It is also possible to glue the pads into the supporting surfaces.

The soft pads according to the invention are made of a material having physiologically harmless characteristics whose Shore-D hardness lies in the range of 10 to 40. Silicone rubber can be utilized as such a material.

By utilizing soft pads of different form, a pad system can be advantageously formed which includes several pad pairs wherein the pads making up each pair are the same. However, the respective pad pairs can have different forms. Such a pad system makes it possible for the optician to adapt a spectacle frame selected on the basis of aesthetic values to the anatomical characteristics of the face form by the insertion of a pad pair haing a suitable form. In this way, very different anatomical characteristics can be taken into account as they occur, for example, between persons of different races. In this connection, the pads of a pad pair can be connected with each other.

BRIEF DESCRIPTION OF THE DRAWING

The invention will now be described with reference to the drawing wherein:

FIG. 1 is an elevation view of a spectacle frame into which the soft pads of the soft-pad system according to the invention can be clipped, the view of the spectacle frame being seen from the side thereof facing the eyes;

FIG. 2 is a pair of soft pads for clipping into the spectacle frame of FIG. 1;

FIG. 3a is a side elevation view, in section, taken in the longitudinal direction of a soft pad according to an embodiment of the invention;

FIG. 3b is a section view of the soft pad of FIG. 3a taken along line a—a;

FIG. 4a is an elevation view, in section, taken in the longitudinal direction of a soft pad according to another embodiment of the invention;

FIG. 4b is a section view of the soft pad of FIG. 4a taken alone line a—a; and,

FIGS. 5a to 5d show side elevation and end elevation views of four additional embodiments of soft pads according to the invention.

DESCRIPTION OF THE PREFERRED EMBODIMENTS OF THE INVENTION

The spectacle frame shown in FIG. 1 has two lens frames (1, 2) which are interconnected by a nose bridge 3. The spectacle lenses are seated in the lens frames (1, 2). The spectacle holders 19 are connected to the spectacle frame by means of respective hinges 18 at the temple-ends of the lens frames. Pad legs (4, 5) are provided on the lens frames (1, 2) in the nose flank region.

The right-hand pad leg 5 shows a recess 6 formed therein having an inner surface 7 which is even and faces toward the nose of the person wearing the spectacles. The depth of recess 6 is approximately 1 mm. The surface 7 is provided with a slit-like hole 8 which permits the soft pads (9, 10) to be clipped into place. A soft-pad pair is shown in FIG. 2. When the pad 9 is clipped into the recess 6, the shank-like projection 11 penetrates the slit-like hole 8 and assures a firm seat of the pad by means of the elasticity of the pad material.

As shown in FIG. 2, the pads (9, 10) are interconnected by means of a band 14 which is preferably made of the same material as that of the pads. The pad pair (9, 10) and the band 14 are preferably made as a single piece. As FIG. 1 shows, the band 14 defines a saddle bridge after the pads (9, 10) are seated in the spectacle frame. Thus, the band 14 lies on the root of the nose and serves a supporting function. In this way, the weight of the spectacles is distributed over a relatively large bearingsurface.

In FIG. 1, the soft pad 10 is clipped into the left pad leg 4. FIG. 1 shows that the supporting surface of the pad 10 projects upwardly beyond the outer edge of the recess 6 pad leg 4 so that the spectacle frame lies only with the pads (9, 10) on the nose flanks of the person wearing the spectacles.

If one utilizes pads having uniform thickness, then the nose angle is predetermined by the recess 7 of the pad legs (4, 5), the nose angle being the acute angle which the pads conjointly define.

The soft pads according to the invention have a different thickness at different locations of their bearing surfaces. With these soft pads according to the invention, the selection of a corresponding pad pair permits the nose angle to be selected such that the latter departs from that given by the recess 7 in the pad legs (4, 5).

The pad 10 of FIGS. 3a and 3b is wedge-shaped and is shown in FIG. 3a in vertical section. The shank-like projection for attaching the pad in the corresponding pad leg is identified by reference numeral 12. The rearward end face 16 of the projection 12 is somewhat larger than the cross-sectional surface of the projection 12.

FIGS. 4a and 4b show an embodiment of the invention wherein the pad 17 is wedge-shaped when viewed in horizontal section (FIG. 4b).

From the above, it is seen that the inclination of the bearing surfaces with respect to the nose flank can be pre-selected with the soft pads of FIG. 3 or FIG. 4; that is, by utilizing such pads, a spectacle frame with fixed pad legs (4, 5) can be adapted to different anatomical situations.

The soft pads according to FIGS. 3 and 4 are so configured that their thickness at the thinnest end exceeds the depth of the recess of the pad leg. The minimal thickness is approximately 1.5 mm.

A combination of FIGS. 3a and 4b is also possible; that is, such a pad has both a wedge-shaped vertical cross section and a wedge-shaped horizontal cross section.

For specific facial forms, the adaptation of a spectacle frame is especially difficult; for example, the Asiatic facial form hardly provides a supporting bearing surface in the nose root region.

The embodiments shown in FIGS. 5a to 5d show forms of soft pads which make it possible to provide a trouble-free spectacle adaptation in cases of difficult anatomical situations. In all of the embodiments shown in FIGS. 5a to 5d, the bearing surfaces of the pads are curved so as to be convex.

In the embodiment of FIG. 5a, the pad is curved both in vertical cross section and in horizontal cross section and the bearing surface has the form of a flat sphere, of an ellipsoid or of a similar spatial surface. In the embodiment according to FIG. 5b, the pad is also configured so as to be wedge-shaped in horizontal section. In the embodiment of FIG. 5c, the pad is wedge-shaped in vertical section. Finally, in the embodiment of 5d, the pad is wedge-shaped in both the horizontal cross section and vertical cross section and has a convexly curved bearing surface.

A multiplicity of other forms for the pad of the invention can take account of the bearing surfaces of special anatomical characteristics of persons wearing the spectacles by means of a corresponding distribution of the pad thickness.

It is understood that the foregoing description is that of the preferred embodiments of the invention and that various changes and modifications may be made thereto without departing from the spirit and scope of the invention as defined in the appended claims.

What is claimed is:

1. A soft-pad system for a spectacle frame to be worn on the nose of a wearer, the nose having nose flanks and the spectacle frame having two pad legs in the region of the nose flanks of the nose of the wearer, the soft-pad system comprising:

said pad legs having respective recesses formed therein;

two pads each of which has a bearing front surface for supporting the spectacle frame on the nose flank of the wearer and a rearward surface opposite said front surface;

each of said pads further having different thicknesses at respectively different locations between said surfaces so as to permit said bearing front surface to be adapted to the form of the nose flank of the wearer;

said pads being inserted into corresponding ones of said recesses so as to cause substantially the entire rearward surface thereof to be in full contact engagement with respective ones of said pad legs so as to be fully supported thereagainst thereby preventing an unwanted deformation of said pads when the spectacle frame is worn by the wearer; and, each of said recesses having a predetermined depth; each of said pads having a cross-sectional thickness at one location thereon which is less than at other locations of said pad; and, said cross-sectional thickness at said one location being greater than said depth of the recess accommodating said pad to permit the adaption of one and the same spectacle frame to different anatomical characteristics of the face of the person wearing the spectacles.

2. The soft-pad system of claim 1, each of said pads having a wedge-shaped configuration.

3. The soft-pad system of claim 2, said pad having a wedge-shaped vertical cross section.

4. The soft-pad system of claim 2, said pad having a wedge-shaped horizontal cross section.

5. The soft-pad system of claim 1, the bearing surface of each of said pads being curved so as to be convex.

6. The soft-pad system of claim 5, each of said pads also having a wedge-shaped configuration.

7. A soft-pad system for a spectacle frame to be worn on the nose of a wearer, the nose having nose flanks and the spectacle frame having two pad legs in the region of the nose flanks of the nose of the wearer, the soft-pad system comprising:

said pad legs having respective recesses formed therein;

a plurality of pairs of pads, the pads of each pair being detachably insertable in corresponding ones of said recesses and being identically configured, the pads of each pair being configured differently from the pads of the other pairs thereby accommodating respectively different facial contours in the region of the nose;

said pads being inserted into corresponding ones of said recesses so as to cause substantially the entire rearward surface thereof to be in full contact engagement with respective ones of said pad legs so as to be fully supported thereagainst thereby preventing an unwanted deformation of said pads when the spectacle frame is worm by the wearer; and, each of said recesses having a predetermined depth; each of said pads having a cross-sectional thickness at one location thereon which is less than at other locations of said pad; and, said cross-sectional thickness at said one location being greater than said depth of the recess accommodating said pad to permit the adaption kof one and the same spectacle frame to different anatomical characteristics of the face of the person wearing the spectacles.

8. The soft-pad system of claim 7, each of said pair of pads including a band interconnecting the pads thereof which defines a saddle bridge after said pads are seated in said recesses, respectively.

9. A spectacle frame to be worn on the nose of a wearer, the nose having nose flanks and the spectacle frame comprising:

two lens holders;

a bridge interconnecting said lens holders;

said lens holders defining respective pad legs facing toward the nose flanks of the nose of the wearer of the spectacle frame;

a pad system including respective recesses formed in said pad legs;

a pair of pads, the pads of said pair of pads being insertable into corresponding ones of said recesses;

each of said pads having a bearing surface extending over its length and having different thicknesses at respectively different locations on said surface;

said pads being inserted into corresponding ones of said recesses so as to cause substantially the entire rearward surface thereof to be in full contact engagement with respective ones of said pad legs so as to be fully supported thereagainst thereby preventing an unwanted deformation of said pads when the spectacle frame is worn by the wearer; and, each of said recesses having a predetermined depth; each of said pads having a cross-sectional thickness at one location thereon which is less than at other locations of said pad; and, said cross-sectional thickness at said one location being greater than said depth of the recess accommodating said pad to permit the adaption of one and the same spectacle frame to different anatomical characteristics of the face of the person wearing the spectacles.

* * * * *

UNITED STATES PATENT AND TRADEMARK OFFICE
CERTIFICATE OF CORRECTION

PATENT NO. : 4,802,754
DATED : February 7, 1989
INVENTOR(S) : Heinz Neef

It is certified that error appears in the above-identified patent and that said Letters Patent is hereby corrected as shown below:

In column 1, line 35: delete "forms" and substitute -- form -- therefor.

In column 1, line 63: delete "haing" and substitute -- having -- therefor.

In column 2, line 54: delete "ringsurface" and substitute -- ring surface -- therefor.

In column 2, line 58: insert -- of the -- between "6" and "pad".

In column 4, line 64: delete "kof" and substitute -- of -- therefor.

Signed and Sealed this

Eleventh Day of July, 1989

Attest:

DONALD J. QUIGG

Attesting Officer

Commissioner of Patents and Trademarks